Figure 5:
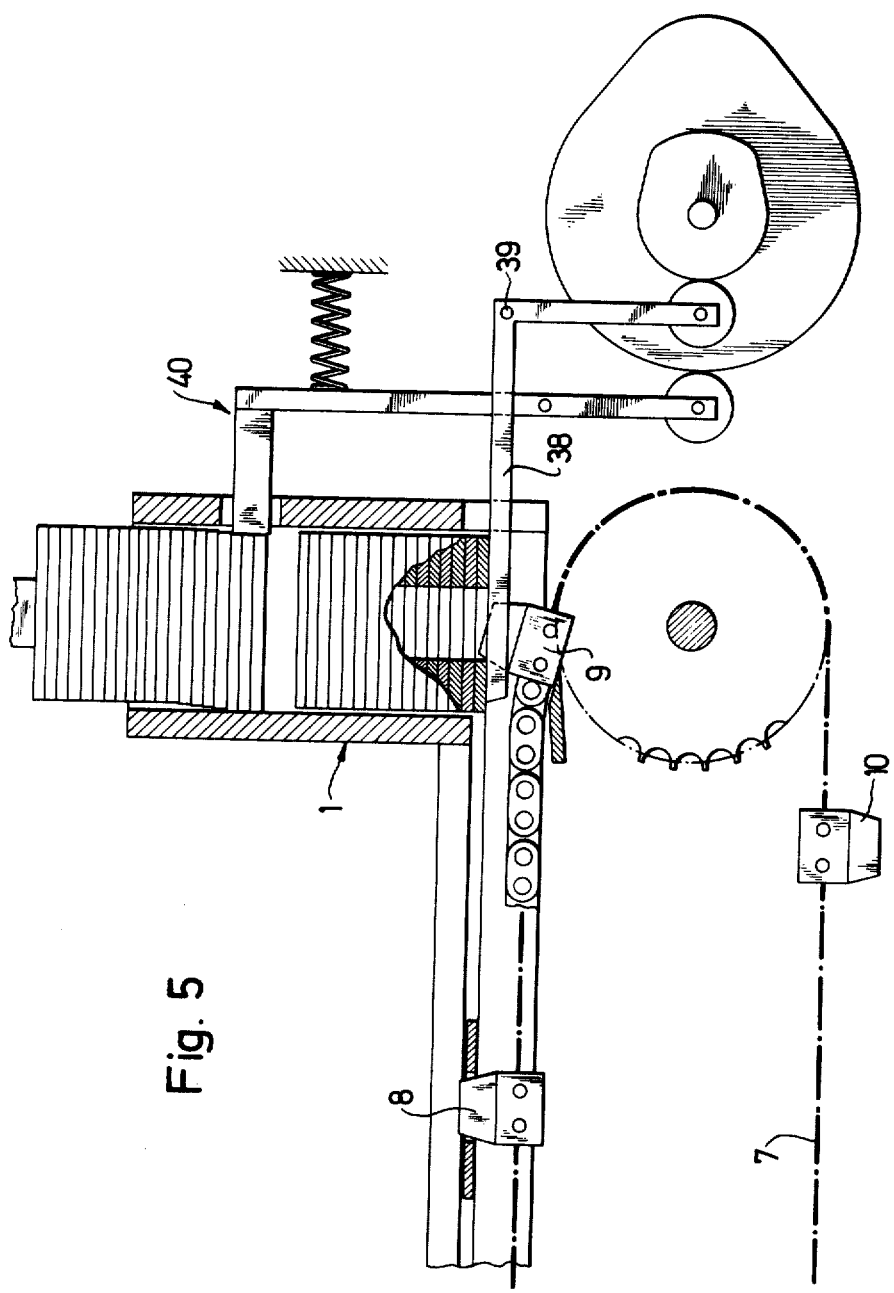

United States Patent

Mundt et al.

[11] 3,943,029
[45] Mar. 9, 1976

[54] SLIDE FRAME-WELDING APPARATUS

[76] Inventors: Peter Hans Ernst Mundt, Wankweg 9; Otfried Urban, Achenfeldstrasse 22, both of 8100 Garmisch-Partenkirchen; Arnold Neuhold, Esterbergstrasse 40, 8105 Farchant, all of Germany

[22] Filed: Sept. 21, 1973

[21] Appl. No.: 399,538

[30] Foreign Application Priority Data
Sept. 21, 1972 Germany.................. 346624

[52] U.S. Cl. .............. 156/443; 156/557; 156/571; 156/580
[51] Int. Cl.² ............... B29C 27/02; B32B 31/20
[58] Field of Search .......... 156/108, 572, 443, 570, 156/564, 573, 580, 73.1, 571, 442.1, 463, 476, 557

[56] References Cited
UNITED STATES PATENTS

| | | | |
|---|---|---|---|
| 1,454,701 | 5/1923 | Clarke | 156/442.1 |
| 1,485,051 | 2/1924 | Pitney | 156/442.1 |
| 3,067,805 | 12/1962 | Flynn | 156/108 |
| 3,255,067 | 6/1966 | Sontheim et al. | 156/570 |
| 3,562,074 | 2/1971 | Mundt et al. | 156/580 |
| 3,565,721 | 2/1971 | Spaulding et al. | 156/557 X |
| 3,709,755 | 1/1973 | Wochner | 156/557 X |
| 3,816,219 | 6/1974 | Hurlbut et al. | 156/108 |

*Primary Examiner*—Douglas J. Drummond
*Assistant Examiner*—M. G. Wityshyn
*Attorney, Agent, or Firm*—Fleit & Jacobson

[57] ABSTRACT

The apparatus serves to weld together the two parts of a slide frame which is made of plastics material and consists of a base part and a cover part, and to align the welded frames on carrying and centering rods. The apparatus comprises two feed wells, from which tracks extend to an ultrasonic welding horn, and downwardly flaring two centering wells, which succeed the ultrasonic welding horn and are provided each with a plunger disposed above the track.

4 Claims, 9 Drawing Figures

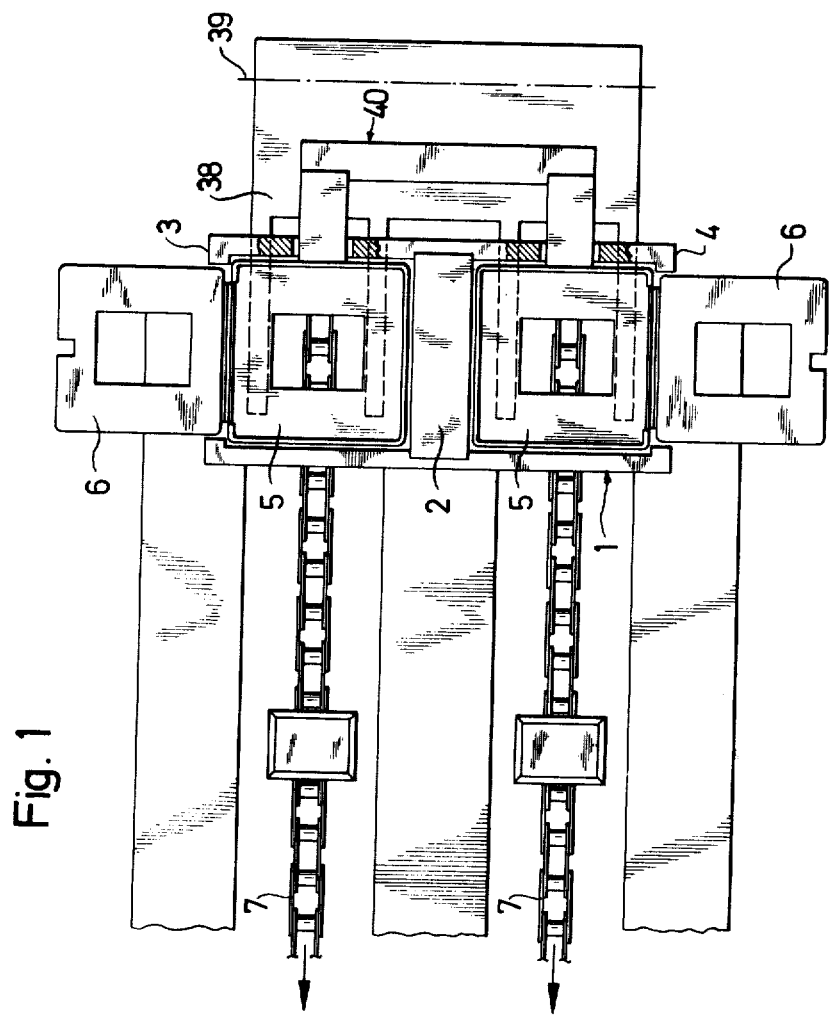

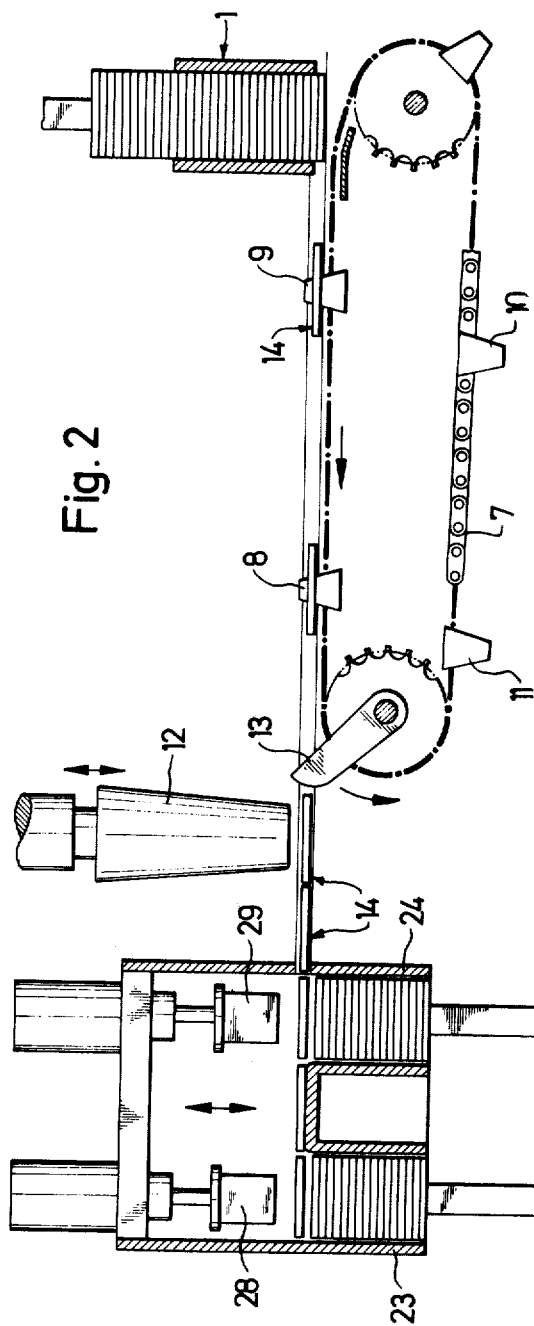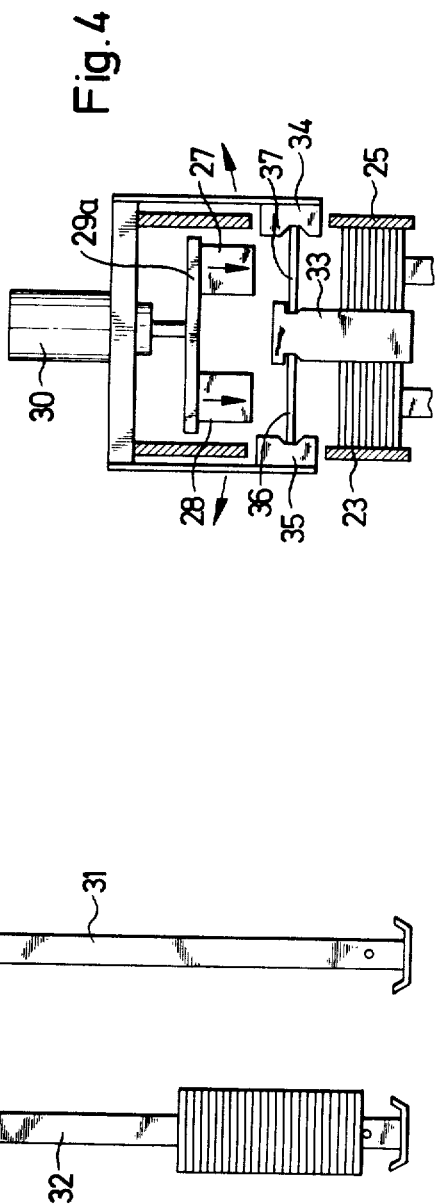

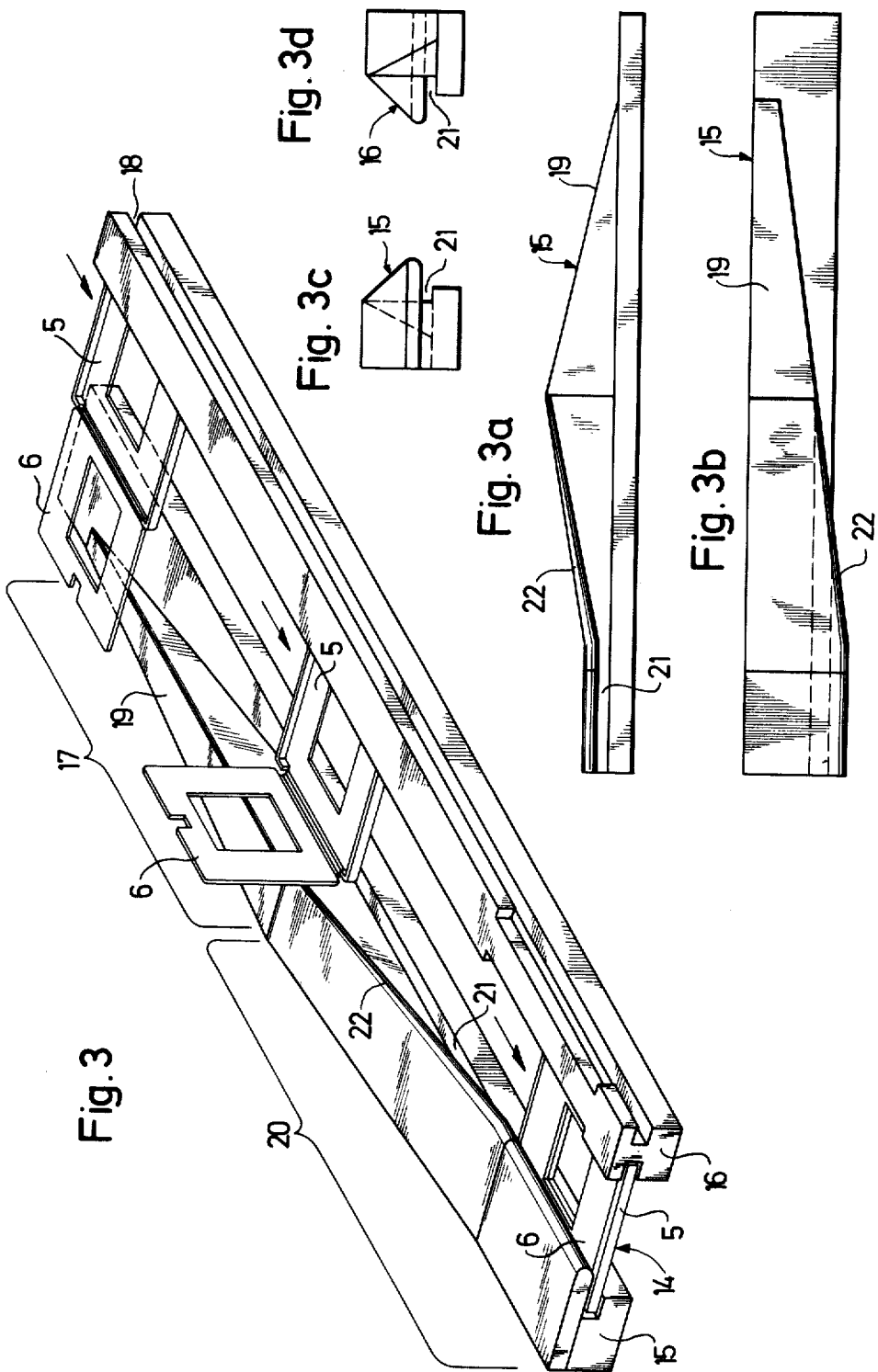

SLIDE FRAME-WELDING APPARATUS

This invention relates to apparatus for welding together the two parts of a slide frame which is made of plastics material and consists of a base part and a cover part, and for aligning the welded frames on carrying and centering rods, which apparatus comprises two feed wells, from which tracks extend to an ultrasonic welding horn, and two downwardly flaring centering wells, which succeed the ultrasonic welding horn and are provided each with a plunger disposed above the track.

A known apparatus for welding together the two parts of a slide frame which is made from plastics material and consists of a base part and a cover part, and for aligning the welded frames on carrying and centering rods, comprises separate feed wells for the base parts and cover parts, which wells are continued by a lower track for the base part and an upper track for the cover part, which tracks merge under an ultrasonic welding horn.

A pusher is associated with each feed well, and these sliders are interconnected. At the end of a common track, a centering well is provided, which flares downwardly and is provided with a plunger disposed above the track (Printed German Application No. 1,287,326).

It is an object of the invention to increase the output capacity of the known apparatus so that slide frames made of plastics material can compete even better with the cheap cardboard slide frame.

In an apparatus of the kind described first hereinbefore, this object is accomplished by the invention in that the feed wells form a double well and are open on those sides which are at right angles to the direction of travel, that an endless conveyor belt, e.g., a chain, provided with a plurality of flights, is associated with each feed well and moves the frames almost as far as to the ultrasonic welding horn, that the tracks are designed so that they bend up the cover part from a horizontal plane into a vertical plane in a preceding portion and guide the cover part into the base part in a succeeding portion. An apparatus according to the invention has the advantage that it can be used to weld and stack slide frames having parts connected by a film hinge. In the known apparatus the pushers had to be returned to their initial position whenever they had fed a slide frame to the ultrasonic welding horn. The output of the machine can now be increased by one-half because an endless conveyor belt having flights is provided. To ensure nevertheless the required precision during the ultrasonic welding operation, the means for feeding the slide frames are divided and the ultrasonic welding horn is preceded by centering fingers, which ensure an exact centering of the slide frames under the ultrasonic welding horn. The tracks are so designed that the above-mentioned slide frame, which is of special design, during its travel is made ready for being welded. The output of the apparatus according to the invention is limited virtually only by the welding rate, i.e., by the duration of the welding operation and of the upward stroke of the ultrasonic welding horn.

To ensure a continuous operation of the apparatus, the ultrasonic welding horn is succeeded by centering wells, which are arranged in successive pairs and provided each with a plunger, and change-over means are provided which effect a change-over to the other two plungers as soon as the first pair of centering rods are full so that the subsequent slide frames can be stacked on another pair of carrying rods and during the same time the two filled carrying rods can be removed and replaced by empty ones.

According to a development of the invention, a lifting plate and a frame-clamping device are associated with the feed well. In view of the high stacks of slide frame parts and the permissible tolerance it is inevitable that the lowermost slide frame parts are possibly canted so that they cannot be satisfactorily carried away by the flights. For this reason the lifting plate is operated to lift the stack to some extent when the feed well has been filled, and subsequently the clamping device is operated which clamps the major portion of the stack against the walls of the feed wells so that only a smaller number of slide frames are superimposed in the lower portion of the well. As soon as the machine is in operation, the clamping device is repeatedly disengaged to release a single frame.

In the following description, an embodiment of the invention will be described by way of example with reference to the drawing.

FIG. 1 is a top plan view showing the special design of the feed well. They consist of a double well 1 having a common partition 2. The feed wells 1 are open on the two sides 3, 4 which are at right angles to the direction of travel. In each well, the base part 5 of a slide frame is guided. The base part 5 has a continuous peripheral edge. The cover part 6 of the frame is secured to the lower part 5 by a film hinge. The two frame parts 5, 6 are supplied to the double well 1 in an unfolded state so that the two frame parts lie substantially in a horizontal plane.

FIG. 2 shows the special design of the conveyor, which consists of an endless conveyor chain 7 provided with a plurality of flights 8–11. A conveyor chain 7 is associated with each well of the double well 1. The flights 8–11 of the conveyor chain 7 extend into the picture aperture of the base part 5 of each frame and the conveyor chain 7 then moves the two frame parts almost to the ultrasonic welding horn 12, where centering fingers 13 are provided, which ensure that the slide frames 14 which have been folded together are exactly centered as they are moved under the ultrasonic welding horn 12. The centering fingers 13 need not move each slide frame 14 as far as to a position under the ultrasonic welding horn 12. The continued travel may also be effected by means of one or more slide frames disposed between the centering finger 13 and that slide frame 14 which is exactly centered under the ultrasonic welding horn 12.

FIG. 3 shows the design of the tracks which in a preceding portion bend up the cover part 6 from a horizontal plane into a vertical plane and in a succeeding portion guide the cover part 6 into the base part 5. Each track consists of two track rails 15, 16. In the first portion 17, only the inner track rail 16 has a groove 18 for guiding the base part 5 of the slide frame. In this portion, the outer track rail 15 is provided on its top with a rising cam 19, which widens toward the track and causes the cover part 6 to be bent up from its substantially horizontal initial orientation into a vertical plane. In the portion 20, the track rail 15 is provided with a guide groove 21 and above the same with an inwardly widening deflecting ledge 22, which ensures that the cover part 6 has been guided into the base part and prepared for the welding operation when it has reached the end of the track.

The track rail 15 is shown in side elevation in FIG. 3a and in a top plan view in FIG. 3b. FIGS. 3c and 3d are elevations showing the track rails 15 and 16, respectively, as viewed from the ultrasonic welding horn.

The design of the centering wells is apparent from FIG. 1 in conjunction with FIG. 4. FIG. 4 is a front elevation showing the centering wells. The apparatus comprises two successive pairs of centering wells, i.e., four centering wells 23 to 26. FIG. 4 shows the centering wells 23 and 25 and FIG. 2 shows the centering wells 23 and 24. Each centering well is provided with a plunger. The plungers 27, 28 are shown in FIG. 4 and the plungers 28, 29 are shown in FIG. 2. Each pair of plungers, e.g., 27, 28, are carried by a common holder 29 and by means of a pressure fluid actuator 30 can be moved up and down in unison. The centering rods 31, 32 are shown in FIG. 2. It will be understood that a centering rod is associated with each centering well. FIG. 4 shows also the guides 33, 34, and 35 for the slide frames 36, 37. Each outer guide 34, 35 can be swung out so that the plungers 27, 28 can force the slide frames 36, 37 into the respective centering wells. In other respects, each centering well is designed as disclosed in the Printed German Application No. 1,287,326.

Associated with the centering wells are change-over means which enable an automatic change-over in such a manner that the plungers which are adjacent to the ultrasonic welding horn are operated first and are arrested as soon as the carrying rods which are adjacent to the ultrasonic welding horn have been filled. At the same time, the two forward plungers are started to fill the two forward centering rods with transparency frames.

It is apparent from FIGS. 1 and 5 that a lifting plate 38 is disposed under the double well 1 and is pivoted about the pin 39. The lifting plate 38 carries the stack of the unfolded slide frames, which are lifted before the apparatus is started. Then a clamping device 40 is operated to clamp a major portion of the stacks in the double well 1 so that only a few slide frames rest on the lifting plate 38. This is readily apparent from FIG. 5. This procedure ensures that the slide frames in the lower portions of the stack will not be canted and the flights can satisfactorily enter the picture aperture of each base frame at the lower end of the stack and can move said lower part from the stack.

What is claimed is:

1. Apparatus for forming a plastic slide frame having a base and a cover integrally hinged thereto and which is substantially coplanar in the as-made condition, with the base and cover each having apertures defined therein, comprising: a dual feed magazine having a partition and two feed wells each feed well comprising a lifting plate and clamping means for maintaining a portion of the frames in a raised position and each feed well having an open side positioned opposite said partition and which feed wells are adapted to receive the bases of a plurality of said frames formed in stacks, said feed well open sides adapted to permit the hinged covers of said plurality of frames in the stacks to protrude horizontally from the magazines; welding means for welding the covers of said frames to their bases; a straight line conveyor disposed below and associated with each feed well, each conveyor being provided with means for engaging the base of the lowermost frame in the stack and transporting the engaged frame with attached cover away from the associated feed well; a rectilinear guideway extending along each conveyor between said associated feed well and said welding means, said guideway comprising means for erecting the horizontal cover of each frame at right-angles to the base and means for folding the cover onto the base with said base and cover apertures in registry to form a folded frame; said conveyor being arranged to disengage said engaging means from said folded frame at a release location on said path; alignment means associated with each of said conveyors and located between said welding means and said conveyor release location for aligning the folded frames with respect to said welding means for a welding operation, and centering wells located adjacent said welding means; and means for inserting welded frames therein, centering means in said centering wells for engaging said welded frames.

2. Apparatus according to claim 1, further including means for transferring the welded frames to said centering wells and wherein the centering wells are fixed in position and two of said wells are associated with each conveyor.

3. Apparatus according to claim 1 wherein said lifting plate is provided beneath the feed wells for temporarily raising the frames in the feed well, and said clamping means is operatively associated with said lifting plate for maintaining a portion of said frames raised when said lifting plate is lowered.

4. Apparatus according to claim 1, wherein the two rectilinear guideways are defined by two substantially parallel outer rails and an inner rail extending centrally therebetween, the inner rail comprising a co-extensive base-receiving groove along each side thereof facing the outer rails, a ramp provided at the end of each outer rail nearer the feed wells, which ramp has a height and a width at the midpoint of the rectilinear guideway which exceed the height and width of that ramp section nearer the feed wells to erect the cover of the frame to an upstanding position as the associated base is conveyed horizontally along said base-receiving groove, and a deflecting ledge overlying a recess at the end of the guideway nearer the welding means of each outer rail, said recesses being in confronting relationship with said base receiving grooves in the inner rail and each ledge extending from the end of the ramp at said midpoint obliquely towards the inner rail to fold the cover down onto the base as the latter is being conveyed along the said groove.

* * * * *